June 8, 1948. O. BINZEL 2,443,129
HAND OPERATED ROTARY FRUIT JUICE EXTRACTOR
Filed May 10, 1945 2 Sheets-Sheet 1
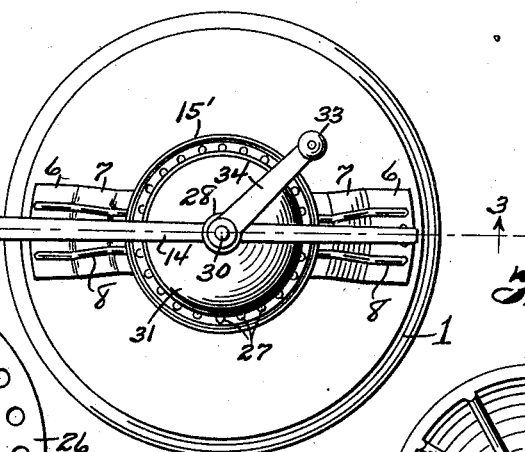
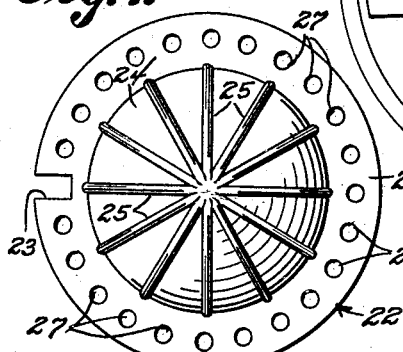
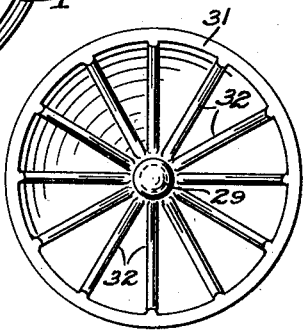
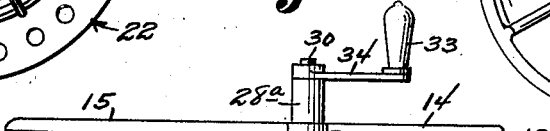
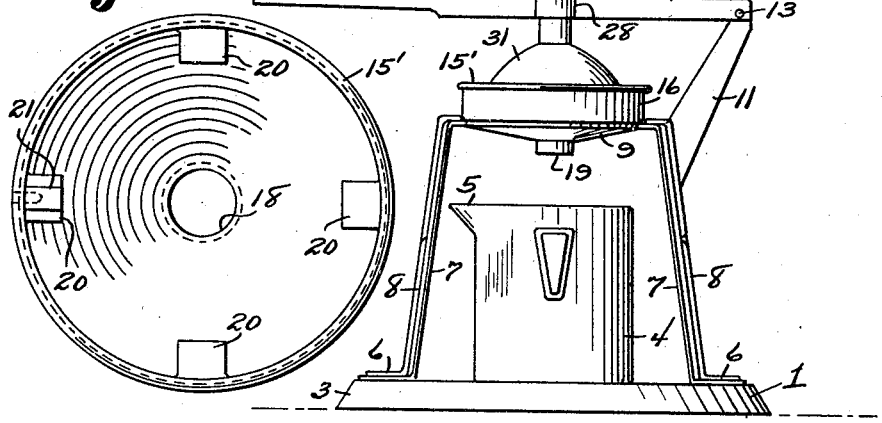
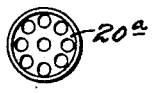
INVENTOR.
Otto Binzel
BY Victor J. Evans & Co.
ATTORNEYS June 8, 1948.    O. BINZEL    2,443,129
HAND OPERATED ROTARY FRUIT JUICE EXTRACTOR
Filed May 10, 1945    2 Sheets-Sheet 2
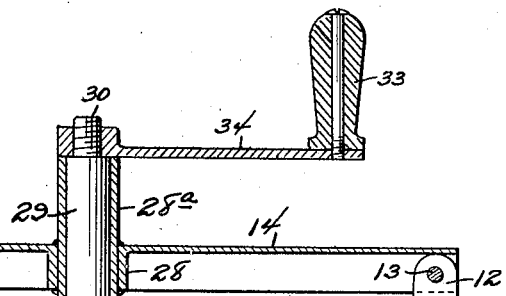
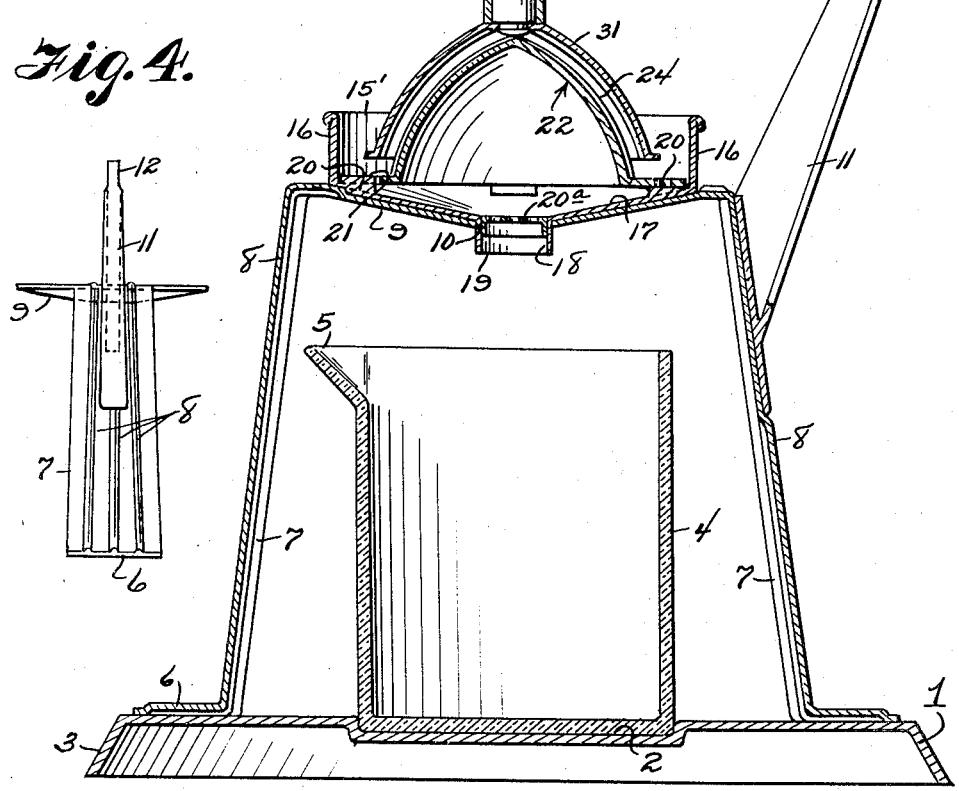
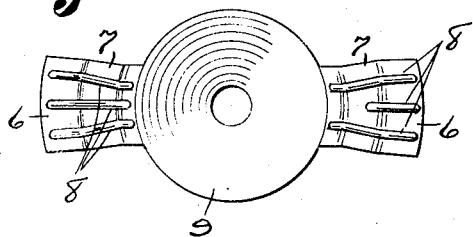
INVENTOR.
Otto Binzel
BY Victor J. Evans & Co.
ATTORNEYS Patented June 8, 1948

2,443,129

UNITED STATES PATENT OFFICE 2,443,129

HAND-OPERATED ROTARY FRUIT JUICE EXTRACTOR

Otto Binzel, Chicago, Ill.

Application May 10, 1945, Serial No. 593,008

1 Claim. (Cl. 146—3)

My present invention, in its broad aspect, has to do with improvements in citrous fruit squeezers, especially lemons and oranges, and has means for thoroughly extruding the juice, by both rotation and squeezing, straining the same, and dispensing the strained juice into a portable container or the like. More particularly, my invention is designed to provide an improved juice extracting, straining and receiving unit wherein the parts may be readily cleaned, which presents a pleasing appearance as a kitchen or table accessory, and wherein the juices are delivered directly into an improved receptacle in the form of a pitcher which is an element of the unit but which may be used to receive and transport and serve the juices at table if so desired. Furthermore, my invention provides an improved arrangement whereby the half lemon or orange is turned by the use of one hand while suitable pressure for squeezing is applied by the other hand in a convenient manner, and my squeezing and turning devices are improved, simplified, rendered easily cleanable, and are most practical for the purposes intended while the support is simple and sturdy and properly mounts the removable juice container.

Other and equally important objects and advantages of my invention will be apparent from the following description and drawings, and it is pointed out that changes in form, size, shape, construction and arrangement of parts is permissible and within the purview of my broad inventive concept and the scope of the appended claim.

In the drawings wherein I have illustrated a preferred form of my invention—

Figure 1 is a top plan view;

Figure 2 is a side elevation;

Figure 3 is a section on the line 3—3 of Figure 1;

Figure 4 is an elevation of the supporting standards, supporting arm for the lever, and downwardly inclined floor for the squeezer elements and strainers;

Figure 5 is a top plan view of the structure shown in Figure 4;

Figure 6 is a top plan view of the upper and rotatable squeezer element;

Figure 7 is a top plan view of the lower and fixed squeezer element;

Figure 8 is a top plan view of the cup-shaped receptacle in which the squeezer elements fit;

Figure 9 is a detail of the strainer fitting in the bottom opening of the cup-shaped receptacle.

In the drawings wherein like characters of reference are used to designate like or similar parts throughout the several views:

The numeral 1 designates the circular metal base, which has a central circular depression 2 and a downwardly extending, outwardly flared or angular annular foot or supporting flange 3 on which the base rests. Adapted to seat in the depression 2, to be prevented from accidental displacement from the base is a glass juice pitcher or container 4 which has a pouring nozzle 5 and is portable to be lifted off of the base when the desired amount of juice is contained therein. Mounted on the base, and having feet 6 are vertically and inwardly inclined supporting standards 7 which are ribbed as at 8 to stiffen their structure, and preferably integrally formed at their top edges is a downwardly inclined, dished, or disk-shaped, circular floor or tray 9 having a central opening 10. Fixed to one of the standards is an upwardly and outwardly inclined arm 11 which has an upstanding ear 12 to which is pivoted as at 13 a horizontally positioned squeezer operating lever 14 of U-shaped construction in cross section and having a handle end 15 opposite the arm 11. Seated on the floor 9 is a cup-shaped receptacle 15—see Figure 8—having upstanding beaded side flanges 16 and an inclined or disk-shaped bottom 17 having a central opening 18 registering with opening 10 and having an annular depending flange or nozzle 19 fitting through the opening 10, a strainer 20a—see Figure 9—which is annularly flanged to fit into the depending flange or nozzle 19. The receptacle has opposed inwardly directed supporting bosses 20 on its bottom, one of which is ribbed as at 21 to support the lower squeezer element 22 which has an opening 23 fitting over the rib 21 to prevent its rotation with respect to the receptacle. The glass juice pitcher or container 4 is directly beneath the openings 10 and 18 and flange or nozzle 19, as shown in Figures 2 and 3.

The lower stationary or fixed squeezer element 22 has a central conical or domed part 24 which is formed with equally spaced radiating ribs 25, and an annular outwardly extending flange 26 provided with spaced openings 27. The flange seats on the bosses 20 and the opening 23 is formed in the flange as shown in Figure 7. The half section of citrous fruit to be squeezed is pressed down on the domed part 24.

The operating lever 14 has a sleeve-like formation 28 between its ends which is fixer to a tubular bearing 28a for a vertical shaft 29 one end of which is threaded as at 30 and the other end squared to receive thereon the upper and rotative squeezer element 31 which is similar in shape to the domed part of the lower squeezer element 22 to engage the lemon or orange to be squeezed therebetween. The rotating squeezer element 31 is internally ribbed as at 32, and an operating handle 33 has its arm 34 threadedly engaged with the threaded end 30 of the shaft 29 whereby to rotate the upper squeezer element while said squeezer element is pressed downwardly by pressure on the lever 14 thereby both squeezing (or pressing) and rotating the lemon or orange or other citrous fruit to fully and completely remove all juices which pass down through the nozzle 19 and are strained and pass into the pitcher or container 4.

From the foregoing, it is believed that the operation and advantages of my invention will be apparent, but it is again emphasized that interpretation of the scope of my invention should only be conclusive when made in the light of the subjoined claim.

I claim:

In a fruit juice extractor for citrus fruits, the combination, which comprises, an elevated horizontally disposed platform having a downwardly dished floor with a centrally positioned outlet opening, a removable cup-shaped receptacle also having a downwardly dished lower surface corresponding with the floor of the platform and having a centrally disposed opening with a forwardly extending annular flange providing a spout positioned in the centrally disposed opening of the floor, a strainer removably mounted in said spout, an upwardly extending dome-shaped lower squeezer element with a horizontally disposed outwardly extending perforated annular flange freely positioned in the receptacle, and an upper complementary squeezer element having a hand actuated lever and a crank by which the element is manually rotated hinged to the platform and adapted to hold one-half of an orange or the like on the said lower squeezer element.

OTTO BINZEL.

REFERENCES CITED

The following references are of record in the file of this patent:

UNITED STATES PATENTS

| Number | Name | Date |
|---|---|---|
| 397,467 | Neichter | Feb. 5, 1889 |
| 1,115,754 | Walker | Nov. 3, 1914 |
| 2,099,170 | Majewski, Jr. | Nov. 16, 1937 |
| 2,238,571 | Scott | Apr. 15, 1941 |

FOREIGN PATENTS

| Number | Country | Date |
|---|---|---|
| 777,869 | France | Dec. 15, 1934 |

OTHER REFERENCES

Plastic Catalog, 1934, Div. 50, U. S. Scientific Library, U. S. Patent Office.

E. E. Mills Corp. Advertisement, 812 W. Van Buren Street, Chicago, Ill. Page following 444-A.